United States Patent [19]
Benjamin

[11] 3,851,668
[45] Dec. 3, 1974

[54] FLOW CONTROL DEVICE
[75] Inventor: Thomas A. Benjamin, Deerfield, Ill.
[73] Assignee: Medical Environment Devices Incorporated, Wheeling, Ill.
[22] Filed: July 27, 1973
[21] Appl. No.: 383,247

[52] U.S. Cl. ............... 137/625.3, 251/342, 138/46, 128/214 C
[51] Int. Cl. ........................... F15d 1/10, F16k 3/22
[58] Field of Search....... 137/516.11, 625.3, 625.33; 251/342, 347, 205; 128/214 C; 138/46

[56] References Cited
UNITED STATES PATENTS
| | | | |
|---|---|---|---|
| 2,692,751 | 10/1954 | Felver | 251/342 |
| 2,862,497 | 12/1958 | Pagano | 251/342 X |
| 3,557,833 | 1/1971 | Gilmont | 137/625.3 |

Primary Examiner—Arnold Rosenthal
Attorney, Agent, or Firm—Kinzer, Plyer, Dorn & McEachran

[57] ABSTRACT

A device for controlling flow by moving a rigid ball up and down through a flexible tube with channels.

11 Claims, 6 Drawing Figures

PATENTED DEC 3 1974 3,851,668
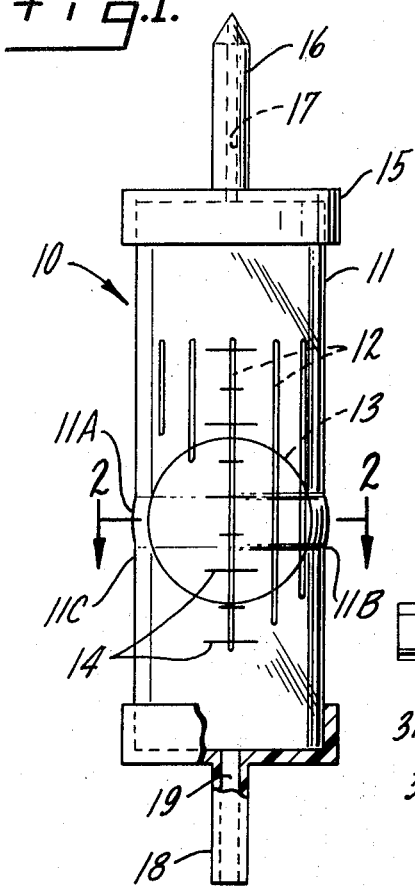
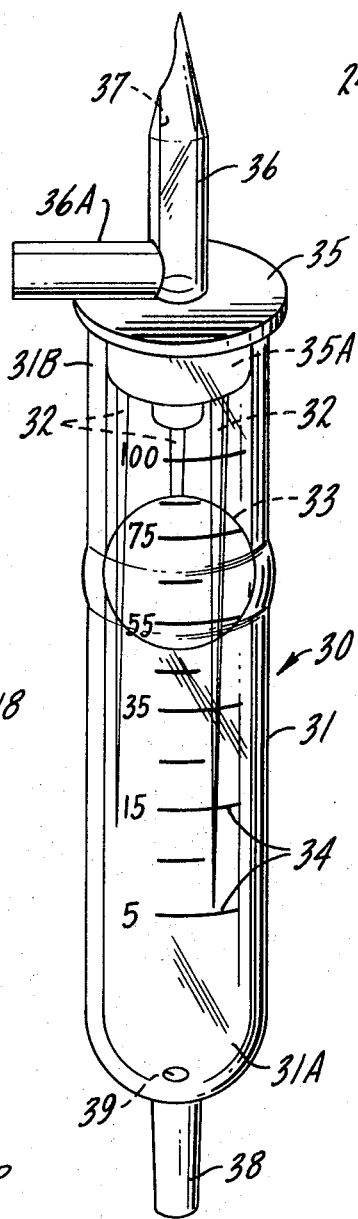
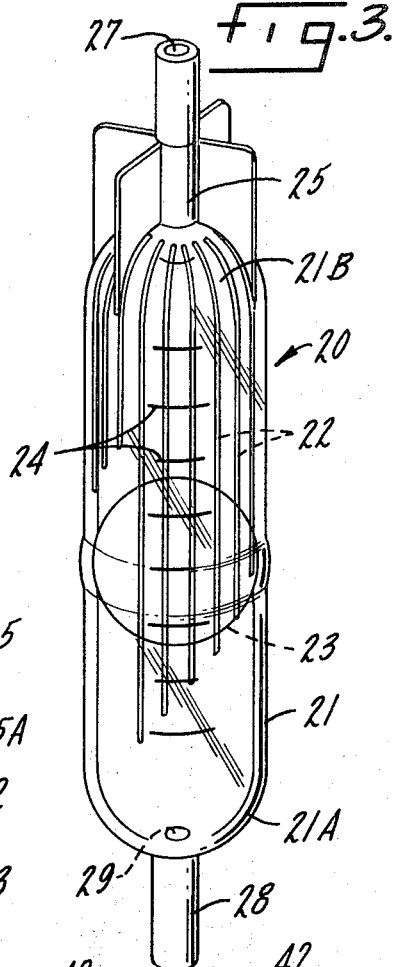
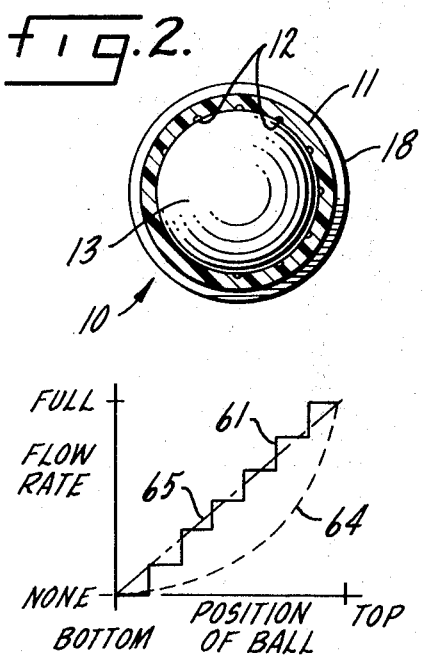
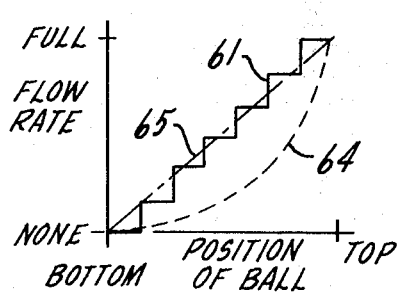
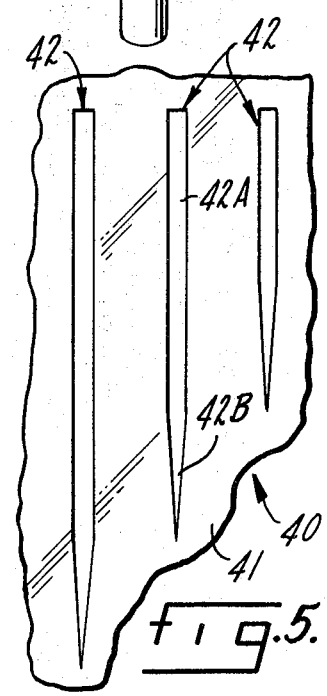

FLOW CONTROL DEVICE

SUMMARY OF THE INVENTION

The present invention relates to a device for controlling flow rates which includes an elongated flexible tube of a given length with an interior surface of given diameter, the tube including at least one channel on its interior surface, and a rigid ball with a diameter greater than the interior surface diameter of the tube so that the ball is capable of being firmly lodged within the tube to form a seal between the ball and the interior surface of the tube exclusive of the channel. The ball is capable of being moved along the length of the tube by external squeezing force applied to the tube, thus positioning the ball at various points along the length of the tube to control the rate of flow.

An object of this invention is to provide a device which can accurately control the flow rate of fluids.

A further object is to provide a versatile disposable flow control device which is suitable for use with medicinal fluids.

Another object is to provide a flow control device which will be able to be set once and not need to be readjusted.

An allied object is to provide a flow control device utilizing a flexible tube substantially uneffected by material fatigue.

A more specific object is to provide a flow control device for regulating intravenous applied solutions.

Other purposes will appear in the ensuing specification, drawings and claims.

BRIEF DESCRIPTION OF THE DRAWINGS

The invention is illustrated diagrammatically in the following drawings wherein:

FIG. 1 is an elevation of a flow control device of the present invention with a portion cut away to show interior elements;

FIG. 2 is a sectional view of the device of FIG. 1 taken along line 2—2;

FIG. 3 is a perspective view of another embodiment of the flow control device of the present invention;

FIG. 4 is a perspective view of still another embodiment of a flow control device of the present invention;

FIG. 5 is a partial view of an arrangement of channels of another embodiment of the present invention; and, FIG. 6 is a graph of flow rate v. position of ball for various embodiments of the present invention.

BACKGROUND OF THE INVENTION

Intravenous applied solution, medications and nutritional products have been administered through the use of a bulk container feeding into plastic tubing attached to a needle which is inserted into the vein. The rate of flow of the solution is normally controlled by squeezing the tubing with a clamp of various configurations thus restricting passage through the tubing and controlling the flow of solution. The currently accepted method of measuring the rate of flow is to count drops of solution as they pass through a relatively large chamber called a drip chamber, and timing the number of drops for a fixed rate of time. A problem that has plagued the industry as long as this system has been available is the reduction in rate of flow, primarily caused by fatigue of the tubing at the point where it is clamped. As the tubing "takes a set," the passage is further restricted and the rate of flow diminishes or ceases. This forces the attendant to return and readjust the rate of flow by opening the clamp somewhat.

Recently there have been some developments to reduce this problem of change of flow rate and to speed the establishment of the proper flow rate, but these devices are expensive, complicated, and not particularly easy to operate. Such devices include electronic drop counters which automatically adjust the clamping effect on the tubing and very accurately molded flow meters which require assembly.

This invention relates to a device to provide accurate flow control which will not be affected by material fatigue and which will provide instant setting of the flow rate.

DETAILED DESCRIPTION OF THE INVENTION

Turning first to FIGS. 1 and 2, there is shown a flow control device 10 utilizing the principle of the present invention. The device includes a flexible tube 11 with interior channels 12 on its inner surface. Also shown is a rigid ball 13 which has a diameter slightly greater than that of the inner diameter of tube 11. Since the diameter of the ball 13 is larger than the internal diameter of the tube 11, the flexible walls of the tube 11 bulge at the periphery of ball 13 as shown by 11A, providing an elastic force which holds ball 13 in place. The elasticity of the tube and the difference in diameter of the ball in the inside of the tube, are controlled so that for any given flow pressure through the tube, the tube force holding the ball will be great enough so that flow through the tube can only go through the cross sectional areas of channels 12, and the non-channel area of the tube blocks flow.

By exerting external squeezing forces approximately at points 11B and 11C, ball 13 can be forced up through the tube 11. Since the channels 12 vary in length, as the ball is moved up (in relation to the drawings) through tube 11 the flow rate will be incrementally increased. Maximum flow will be obtained when the ball 13 is at the top of the tube whereby all of the channels at that end are open to provide area for flow. In a similar manner ball 13 can be moved downward through the tube to decrease the flow rate. The minimum flow rate will be established with the ball 13 at the bottom of tube 11 where there are no channels, thus forming a seal between the entire periphery of the ball and the inner surface of the tube.

As can be seen in FIG. 2, each channel 12 has substantially the same cross sectional area. As seen in FIG. 1 each channel 12 is progressively longer. Thus, when ball 13 is at the top of tube 11 all twelve channels 12 will be available to allow flow. The cross sectional area available for flow will be equal to the combined area of all twelve channels. When ball 13 is in position as shown as in FIG. 2, nine channels are available for flow, so the flow rate will be determined by the cross sectional area of the nine channels. Since in this embodiment, each channel has substantially the same cross sectional area, the flow rate has been decreased by a ratio of 12:9 by movement of ball 13 from the top of tube 11 to the position of FIGS. 1 and 2. The flow rate can be measured through accurate instruments and a scale 14 of the absolute flow can be inscribed or printed on the outside of tube 11.

At the top of tube 11, a connector 15 can be placed which includes a pointer 16 with an interior channel 17 to provide for piercing or otherwise communicating with the interior of a bulk solution container or other fluid source. The bottom of tube 11 is enclosed by another connector 18 which is suitable for connecting the flow control device to tubing which carries the metered fluid to its utilization point. Connector 18 includes an internal channel 19 which provides a conduit from the inside of tube 11 to the external utilization station. Connectors 15 and 18 are conveniently made with an internal diameter smaller than the outside diameter of tube 11 so that the elastic force between the connectors and the tube hold the connectors firmly in place.

FIG. 3 shows a perspective view of a flow control device 20 with flexible tube 21 and internal channels 22. Also shown is rigid ball 23, and a graduated scale 24. The flow control device 20 includes a molded connector 28 and an interior channel 29 which can be connected to tubing to provide conduit to utilization stations. Device 20 also includes connector 25 which is suitable for adding fluid to the flow control device 20 through channel 27. This device 20 includes more channels 22 than that of the device in FIG. 1, thus providing for more increments of flow control and also includes rounded ends 21A and 21B of tube 21.

Turning to FIG. 4, a perspective view of another embodiment of the present invention is shown as flow control device 30. This device includes a flexible tube 31 with tapered channels 32. These tapered channels are of progressively increasing length and provide a decreasing cross sectional area as the distance from the top end of tube 31 increases. A rigid ball 33 with a slightly larger diameter than the internal diameter of tube 31 is used to control the device as in the prior embodiments. With channels 32 tapered, the flow rate is continuously changed as ball 33 is moved up and down the tube rather than incrementally increased or decreased as in the embodiments of FIGS. 1 and 3. Moreover, the embodiment of FIG. 4 causes the flow rate to be changed nonlinearly and the scale 34 is appropriately calibrated. At the top portion of tube 31 where there are a larger number of channels of large cross sectional area the change in flow rate is quite large, and at the lower end of tube 31 where the cross sectional area of the channels is small, the change in flow rate will be much slower.

The embodiment of FIG. 4 includes a molded connector 38 with its outlet channel 39 in a rounded end 31A of tube 31. At the top end 31B of tube 31 is inserted connector 35 with a point adapter 36 and inlet channel 37. This connector includes a secondary inlet 36A which forms an air passage which may communicate with a rigid bulk container or bottle, allowing filtered air to replace solution withdrawn. Connector 35 includes an insert 35A which has an outside diameter slightly greater than the inside diameter of tube 31 so that when connector 35 is inserted in the tube 31, a firm connection will be obtained.

With a single tapered channel, the tube will provide a variation in cross sectional area and be usable as a flow control device. The capacity of the device can be increased by a plurality of tapered channels of the same length. Also, the tapered channels may be of different lengths or progressively increase as in the prior embodiments. Each arrangement will provide a different flow rate change pattern variable for different uses.

In a preferred embodiment of the several shapes of channels, all the channels start at one end of the tube and extend different lengths down the tube from the end. For equal cross sectional area channels, a convenient method of changing the flow rate is to make the channels of progressively longer lengths so the ball will allow flow through the channels sequentially. It is desired to make some increments in flow rate change greater, then some of the channels can be the same length so the ball will allow flow through them in unison.

Finally, FIG. 5 shows a partial view 40 of an interior surface of a flexible tube 41 of another embodiment of the present invention. The interior surface includes channels 42 which include a body portion 42A with substantially uniform cross sectional areas, and a tip portion 42B tapered to provide a decreasing cross sectional area as the distance from the body portion increases. Each of the channels 42 is of progressively longer length. Also, the tip portion 42B of each channel 42 ends at the start of the next shorter channel. The arrangement of the tube with the rigid ball and connectors is similar to the previous embodiments. Thus, as a ball is moved from the bottom of the tube to the top of the tube passing the longest channel first and progressively shorter channels, the flow rate is continuously increased only by the tipped portion of one channel at a time. Thus the arrangement of FIG. 5 provides for a continuous linear variation of flow from completely closed to completely open.

FIG. 6 shows a graph of flow rate, which varies from no flow to full flow, against position of the ball, which varies from the bottom where there is no flow rate to the top where there is full flow rate. A flow control device constructed as in FIGS. 1 or 3 provides an incremental increase as shown by line 61. A flow control device constructed as shown in FIG. 4 provides for a continuously increasing flow rate as shown by line 64. A flow control device constructed as shown in FIG. 5 provides a linear continuously variable flow rate change as shown by line 65. It is apparent that for various applications different flow control is desired, and accordingly the channels may be altered to provide the type of control desired. Thus in some applications incremental control is adequate or desired. In other applications, accurate control is desired in a certain area, but the full flow capabilities of the device are also necessary. Such a system will be best met by a curve as shown by line 64. Finally, some applications require a linear continuously variable system which will be provided by an arrangement corresponding to line 65. Any combinations of the various embodiments can be made, for example one portion of the valve may be linearly continuously variable and another portion incrementally variable.

As a feature of the present invention, the tube or housing of the flow control device may be made at least partially transparent; thus the tubes can be translucent or transparent to allow viewing of interior materials. The ball may be opaque or so formed to be easily visible for observation of the exact setting of the flow control device. In a preferred embodiment, the ball is opaque; however, with a visible fluid like blood, transparent balls could be used. A non-transparent device is also acceptable if a bulge in the tube from the periphery of the ball can be observed.

The devices of the present invention can easily be molded from rubber or plastic and are quite inexpensive. Thus, they are capable of disposable use, which is especially desirable in sterile medical operations, and they provide a degree of freedom in operation functions heretofore unavailable in disposable devices.

The device provides for an easy and accurate establishing of flow rate through the channels of the tube. Because of the small amount of distortion caused by the ball inside the tube and the distribution of that distortion over a relatively wide area, there is no significant reduction of flow caused by the distortion and an unnoticable amount of fatigue. This device eliminates the need for separate flow meters, electric throttling and counting devices, tubing, clamps and various efforts to prevent collapse of the tubing at the clamping point. The channels of the tube can be of various cross sectional shapes; thus the channels may be semicircular in nature as channels 12 or they can be U shaped or V shaped or rectangularly shaped as desired. As long as the channel provides a given cross sectional area for fluid to flow the channel shape is adequate. It should be apparent that the tapered channels may be varied by varying the depth or shape as well as by the width shown in the figures.

Whereas the preferred form of invention has been shown and described herein, it should be realized that there may be many modifications, substitutions and alternations thereto.

I claim:

1. A flow control device comprising:
an elongated flexible tube of a given length with an interior surface of given diameter, generally axially extending channel means formed in the interior surface of said flexible tube, the cross sectional flow area of said channel means varying in an axial direction,
a rigid ball with a diameter greater than said interior surface diameter of said tube wherein said ball is capable of being firmly lodged within said elongated tube to form a seal between said ball and said interior surface of said tube exclusive of said channel means, said ball being capable of being axially moved within said tube by external squeezing force applied to said tube to control fluid flow through said tube.

2. A flow control device as in claim 1 wherein said channel means includes a plurality of channels beginning adjacent one end of said elongated tube.

3. A flow control device as in claim 2 wherein said channels are approximately the same in cross sectional area and of different lengths.

4. A flow control device as in claim 3 wherein said channels are of progressively longer lengths.

5. A flow control device as in claim 2 wherein said channels have a body portion of approximately uniform cross sectional area and a tapered tip portion to provide a decreasing cross sectional area as the distance from said one end of said tube increases.

6. A flow control device as in claim 5 wherein said channels are of progressively longer lengths.

7. A flow control device as in claim 6 wherein said tip portion of a longer channel ends at the start of the next shorter channel.

8. A flow control device as in claim 1 wherein said channel means includes at least one tapered channel to provide a decreasing cross sectional area.

9. A flow control device as in claim 8 with a plurality of channels and said channels are different lengths.

10. A flow control device as in claim 9 wherein said channels are of progressively longer lengths.

11. A flow control device as in claim 1 wherein said tube is made of a flexible at least partially transparent material.

* * * * *